Oct. 14, 1924.
J. I. PICKERING
1,511,908
DIFFERENTIAL LOCK
Filed Feb. 27, 1924
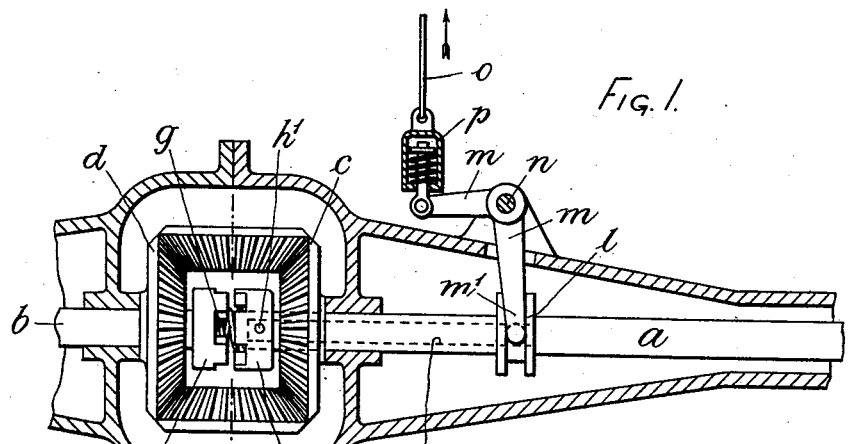
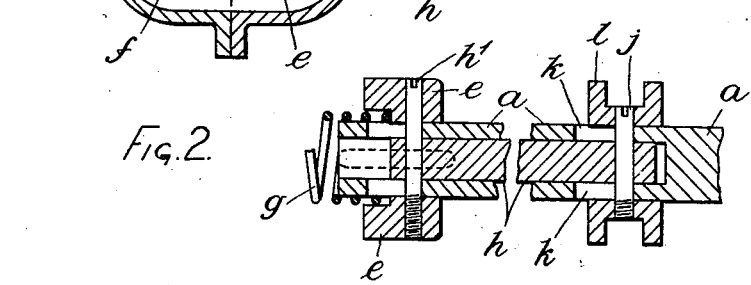
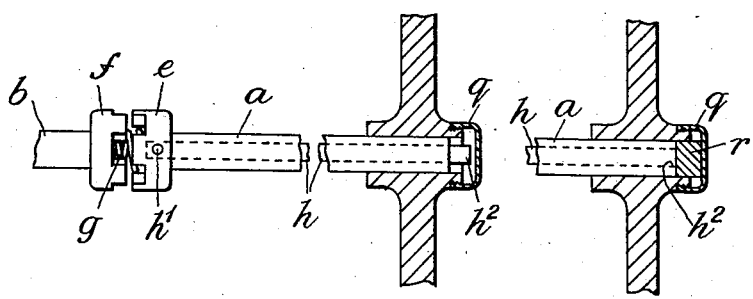
Inventor
Jack I. Pickering
by Wilkinson & Giusta
Attorneys.

Patented Oct. 14, 1924.

1,511,908

UNITED STATES PATENT OFFICE.

JACK IVAN PICKERING, OF HOUNSLOW, ENGLAND.

DIFFERENTIAL LOCK.

Application filed February 27, 1924. Serial No. 695,499.

*To all whom it may concern:*

Be it known that I, JACK IVAN PICKERING, a subject of the King of Great Britain, of 11 Holloway Street, Hounslow, in the county of Middlesex, England, have invented a new and useful Improvement in or Relating to Differential Locks, of which the following is a specification.

This invention relates to differential locks and the like for the wheel axles of mechanically propelled road vehicles where a differential gear is employed or where only one wheel is driven, and has for its object to provide improvements in or for use in connection with such gear.

Hence, if one wheel happens to be on a slippery surface the vehicle cannot move, since that wheel alone is driven and being unable to grip, merely spins whilst the other wheel remains stationary. An illustration of this, is when, by some reason or other a car gets one wheel in a muddy ditch, whilst the other wheel rests on the hard surface of the road.

When in such position a car cannot move by its own power and generally has to be towed out.

Another difficulty occurs when a car is fitted with a brake on the driving shaft.

When such a brake is applied, if both wheels are not on a similar surface one wheel may lock and slide, causing a skid.

On the score of economy some designers omit the differential altogether, but, bearing in mind the aversion the public have against solid axles, have endeavoured to effect a compromise by mounting the rear wheels independently and only driving one.

Such an arrangement is satisfactory under normal conditions, but shows up badly on greasy rods, and steep hills, inasmuch, that one wheel alone being driven, the wheel skids.

The improved differential lock is of the type wherein the wheel shafts are locked together and released by clutch members located between the shaft ends, one clutch member being actuated by a spindle passing axially through one of the wheel shafts so as to be operated by external means.

The improved construction will be described with reference to the accompanying drawings, which illustrate two forms of the invention, and in which, Fig. 1 is a partial view of a pair of wheel axles fitted with a differential gear, the axle casing being shown in section.

Fig. 2 is an enlarged longitudinal section of the wheel axle shown to the right in Fig. 1.

Fig. 3 is a partial view showing a modified form of the invention, the differential gear not being shown.

Fig. 4 is a partial view of the wheel hub and axle illustrated in Fig. 3, the parts being shown in a different position.

In the construction shown in Figs. 1 and 2 the independent wheel axles $a$ and $b$ are connected up to the corresponding bevel wheels $c$ and $d$ of a differential gear of the usual form, and the adjacent ends of the two axles $a$ $b$ are fitted with the opposing members $e$ $f$ of a dog clutch, the member $e$ of which is slidable upon the inner end of the axle $a$ on which it is carried and is pressed apart from the other clutch member $f$ by means of a spring $g$ suitably interposed as shown or otherwise arranged, the said slidable clutch member $e$ is operatively connected as by a pin $h'$ to the inner end of a spindle $h$ passing axially through the centre of the wheel axle $a$ and terminating at a suitable distance outside the differential gear, where it is fitted with a transversely arranged dog or cross pin $j$ adapted to project beyond the axle and to slide in a slot $k$ therein.

The said pin $j$ is mounted in a collar or sleeve $l$ which is adapted to be slidden upon the axle $a$ by means of the forked end $m'$ of a bell crank lever $m$ pivoted upon the shaft casing as at $n$, and operated by suitable rods or cables $o$ from a hand lever (not shown) but which is arranged in convenient position near the driver's seat. Suitable spring arrangements such as a spring loaded plunger $p$ may be interposed in the connections of the operating mechanism where required.

In operation, a pull upon the hand lever will cause the sleeve $l$ upon the axle $a$ to slide thereon, and carry with it the pin $j$, the sliding movement of the latter in the slot $k$ causing a corresponding movement of the spindle $h$ within the axle $a$, thus bringing the clutch members $e$ and $f$ into engagement and locking the two wheel axles $a$ and $b$ together so that the differential gear ceases to operate as such and revolves as one with the two wheel axles.

If desired, the sleeve or collar $l$ which slides upon the axle $a$ may be fitted with or arranged in the form of a ball bearing to reduce friction.

The modified arrangement shown in Figs. 3 and 4 is particularly adapted for use as an emergency device. In this arrangement the spindle $h$ which passes axially through the axle $a$ has its inner end connected to the clutch member $e$ as before whilst the said spindle $h$ passes through the entire length of the axle $a$ and projects as at $h^2$ from the end thereof into the hub cap $q$, the arrangement being such that under normal conditions the free end of said spindle $h$ projects freely in the hub cap $q$ whilst when it is desired to put the differential out of action and lock the two wheels together the hub cap $q$ is removed and a packing block or filling piece $r$ is placed therein, and when the hub cap $q$ is again screwed into place the packing block $r$ will engage the end $h'$ of the spindle $h$ and slide the same within the axle $a$ in such manner as to put the clutch members $e$ and $f$ into engagement and thus lock the wheel axles $a$ and $b$ together so that both wheels are given an equal drive.

It will be readily understood without further illustration or description how the invention may be applied to an arrangement where only one wheel is driven under normal driving conditions and where no differential gear is employed.

What I claim as my invention and desire to secure by Letters Patent is:—

In combination with an axle housing a bell-crank lever fitted directly thereon and having a bifurcated end extending into said housing, a wheel shaft journaled in the housing and having a slotted and recessed inner end, an axially-movable spindle located within the recessed end of the shaft, a collar slidable on the shaft about the slotted portion thereof, a through pin sliding in the slotted part of the shaft, and binding said collar to the spindle, a second wheel shaft, differential wheels on the adjacent inner ends of the shafts, and normally-spaced clutch members on said shafts between the differential wheels, one of said members being fixed to the axially movable spindle which is operated by the sliding collar and bell crank lever whereby the clutch members are put into and out of engagement for locking or unlocking the differential.

JACK IVAN PICKERING.